April 2, 1940.     O. G. BRAUTIGAM     2,195,836
MACHINE FOR MAKING CONFECTIONS
Filed April 14, 1939     14 Sheets-Sheet 4
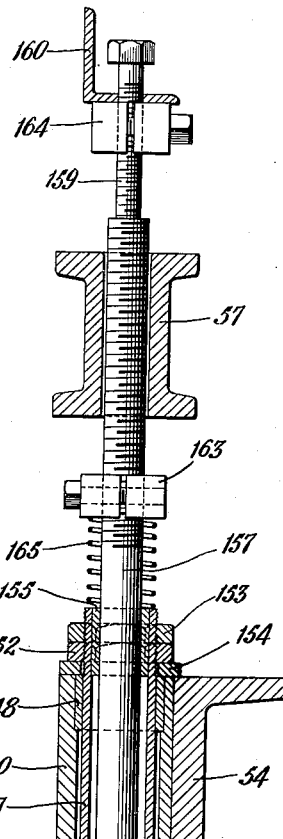
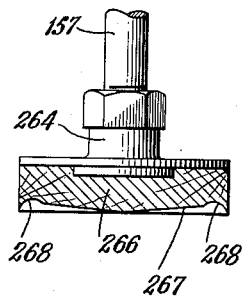
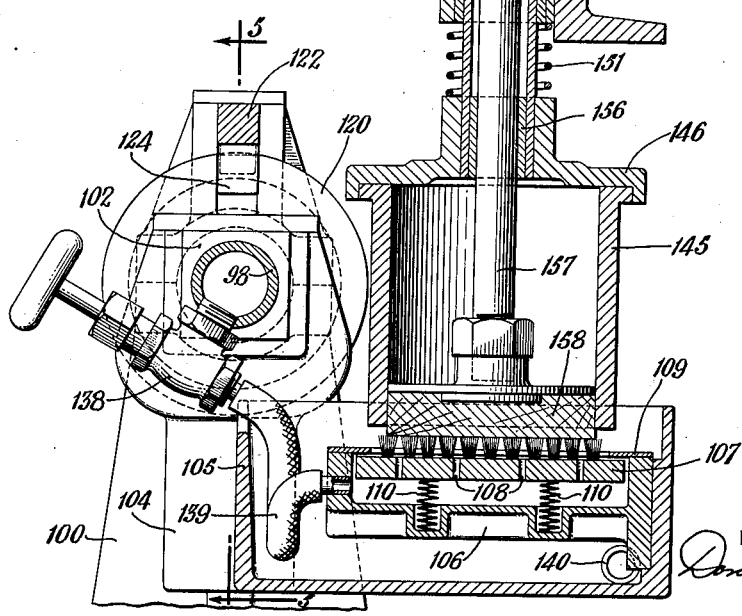
INVENTOR
OTTO G. BRAUTIGAM.
BY
Donald W. Robertson
ATTORNEY April 2, 1940.  O. G. BRAUTIGAM  2,195,836
MACHINE FOR MAKING CONFECTIONS
Filed April 14, 1939  14 Sheets-Sheet 5

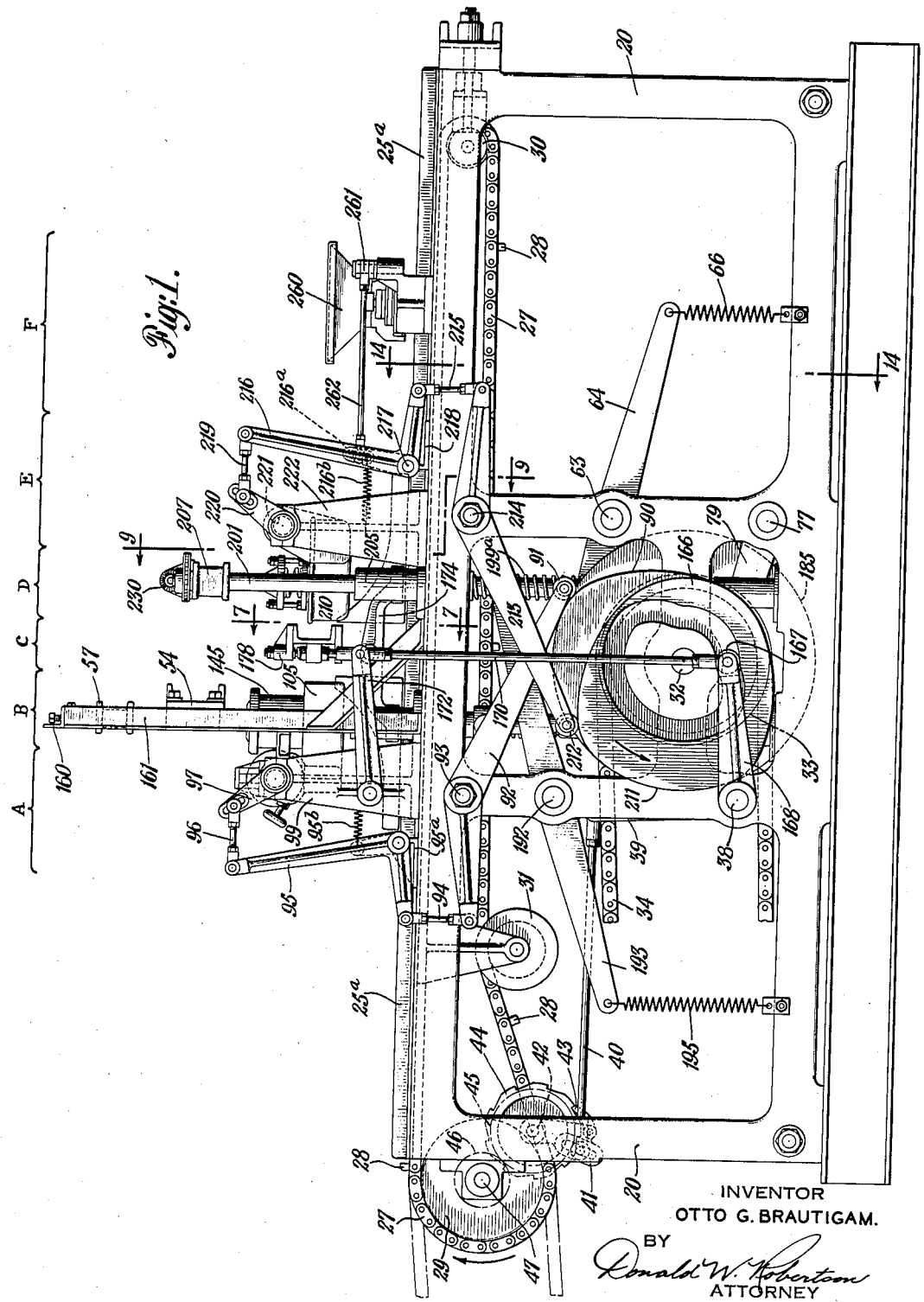

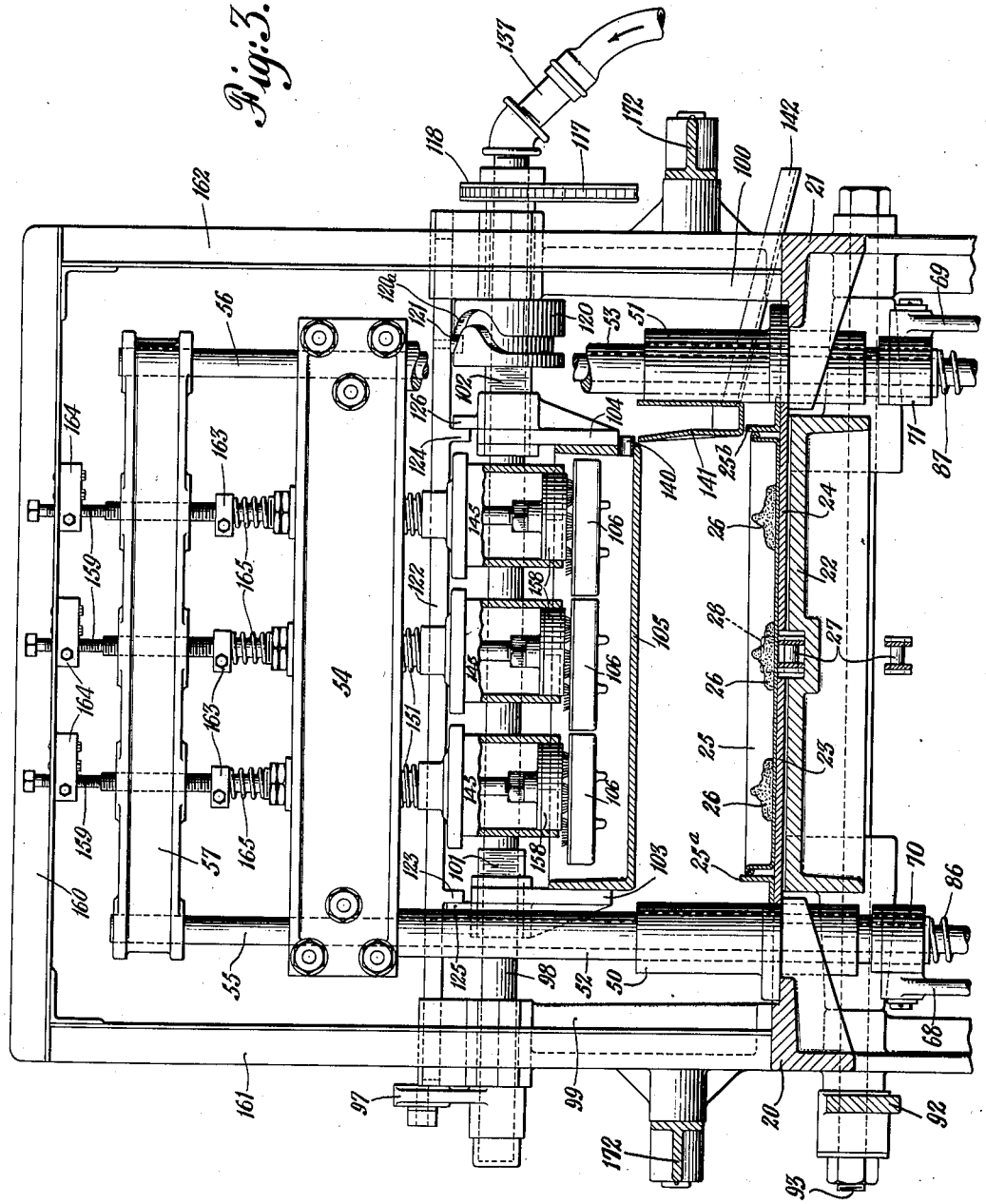

INVENTOR
OTTO G. BRAUTIGAM.
BY
Donald W. Robertson
ATTORNEY

April 2, 1940.  O. G. BRAUTIGAM  2,195,836
MACHINE FOR MAKING CONFECTIONS
Filed April 14, 1939   14 Sheets-Sheet 6
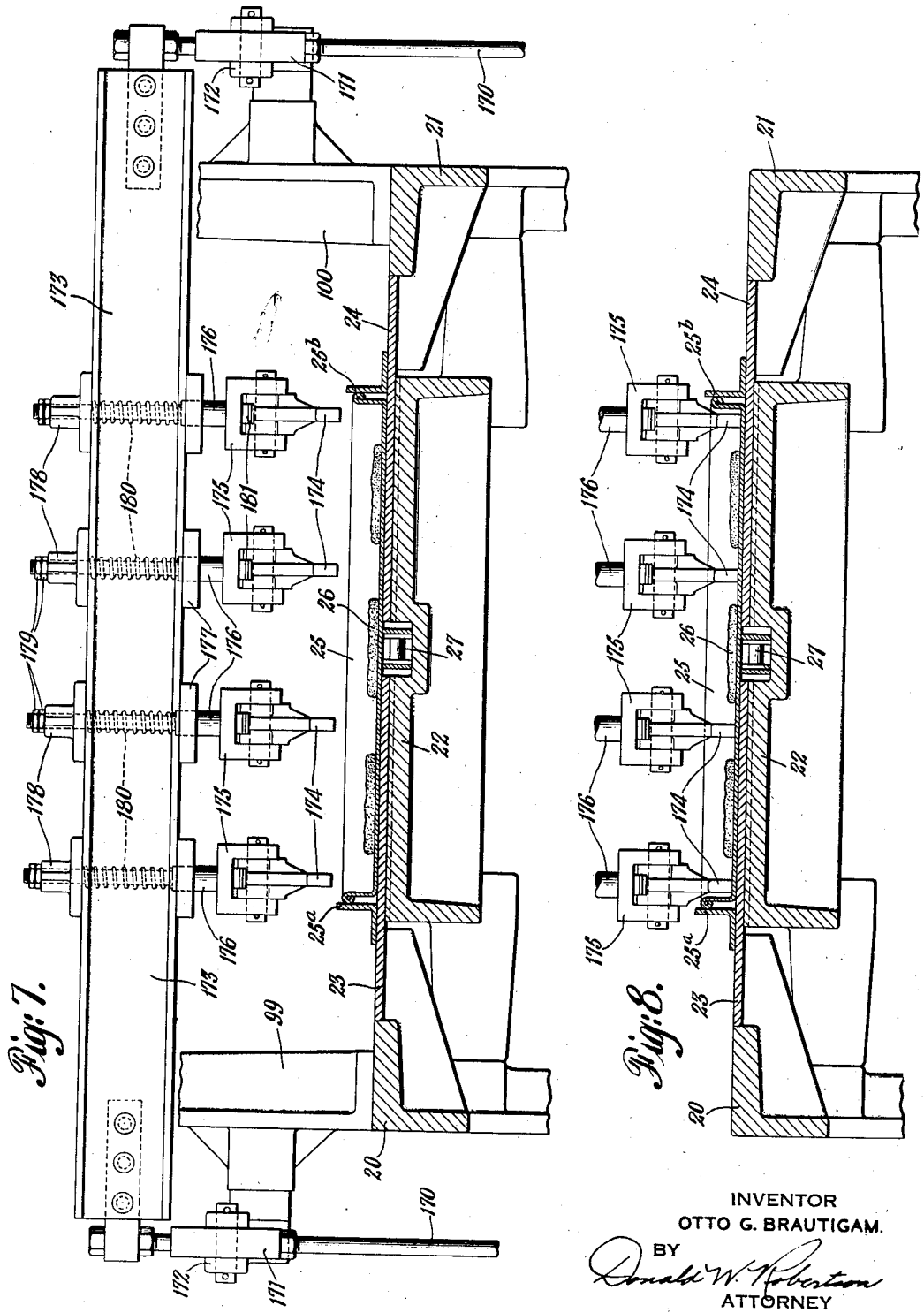
INVENTOR
OTTO G. BRAUTIGAM.
BY
Donald W. Robertson
ATTORNEY

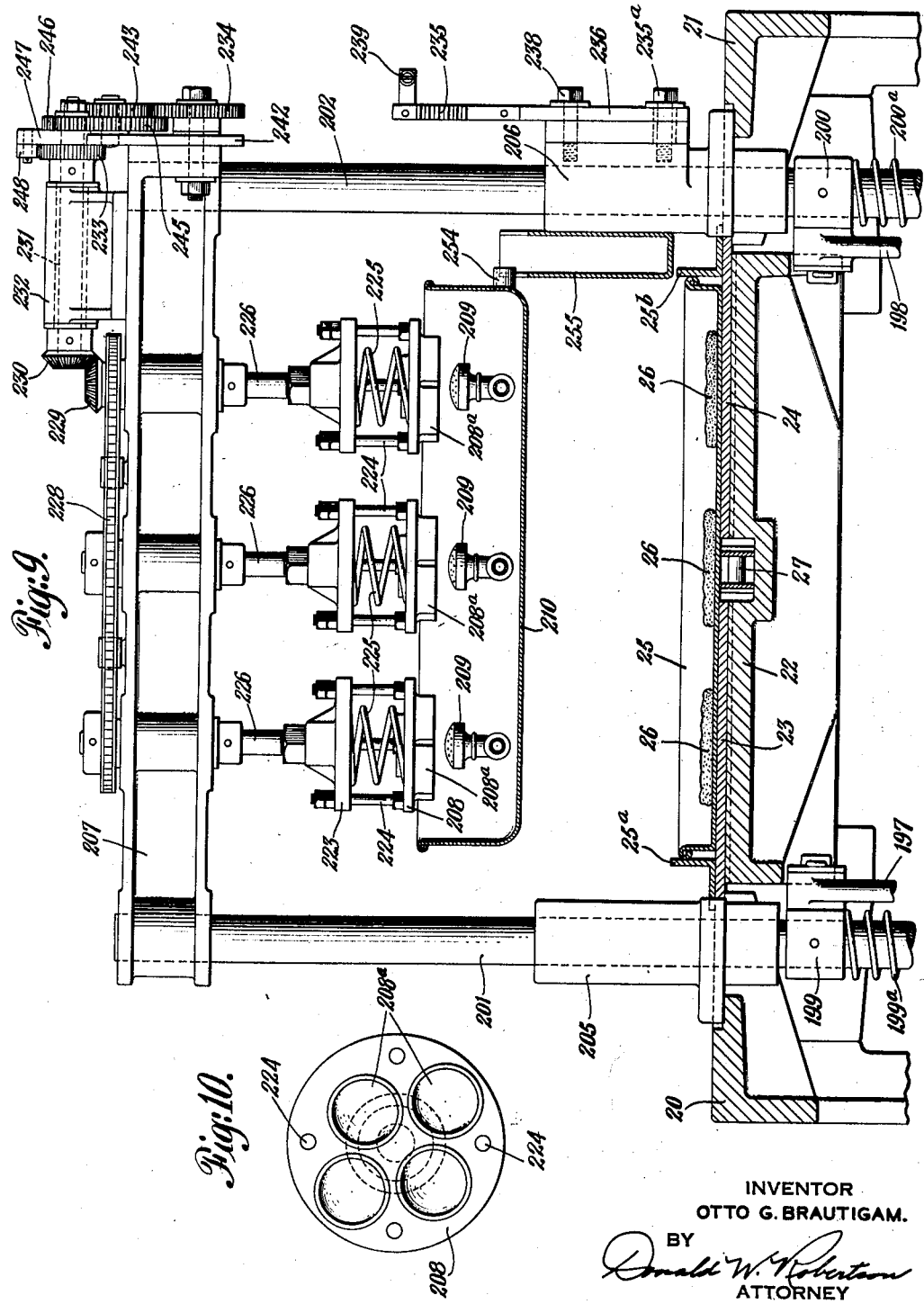

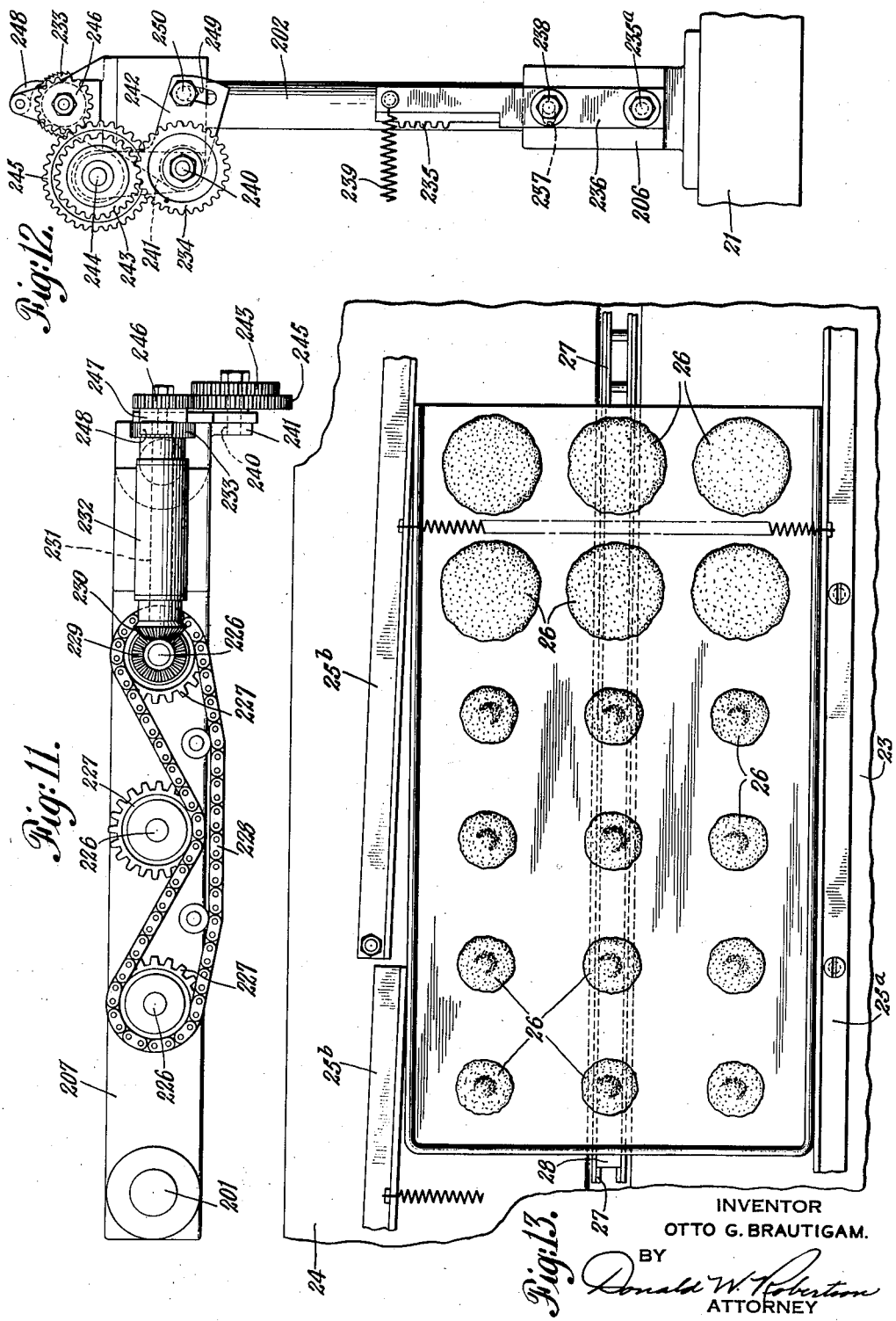

April 2, 1940.  O. G. BRAUTIGAM  2,195,836
MACHINE FOR MAKING CONFECTIONS
Filed April 14, 1939  14 Sheets-Sheet 9

INVENTOR
OTTO G. BRAUTIGAM.
BY
Donald W. Robertson
ATTORNEY

April 2, 1940.　　　O. G. BRAUTIGAM　　　2,195,836
MACHINE FOR MAKING CONFECTIONS
Filed April 14, 1939　　　14 Sheets-Sheet 10

INVENTOR
OTTO G. BRAUTIGAM.
BY
Donald W. Robertson
ATTORNEY

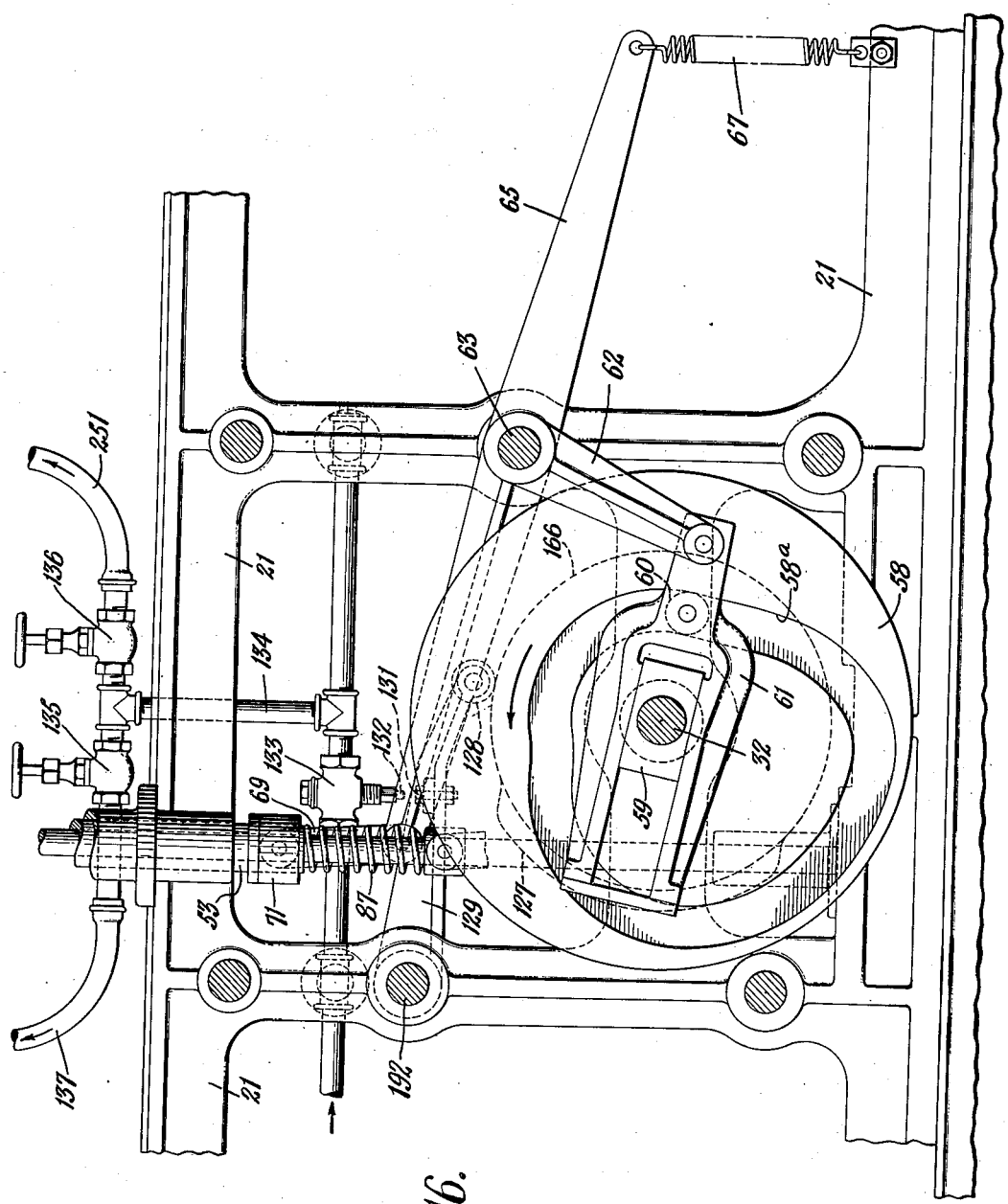

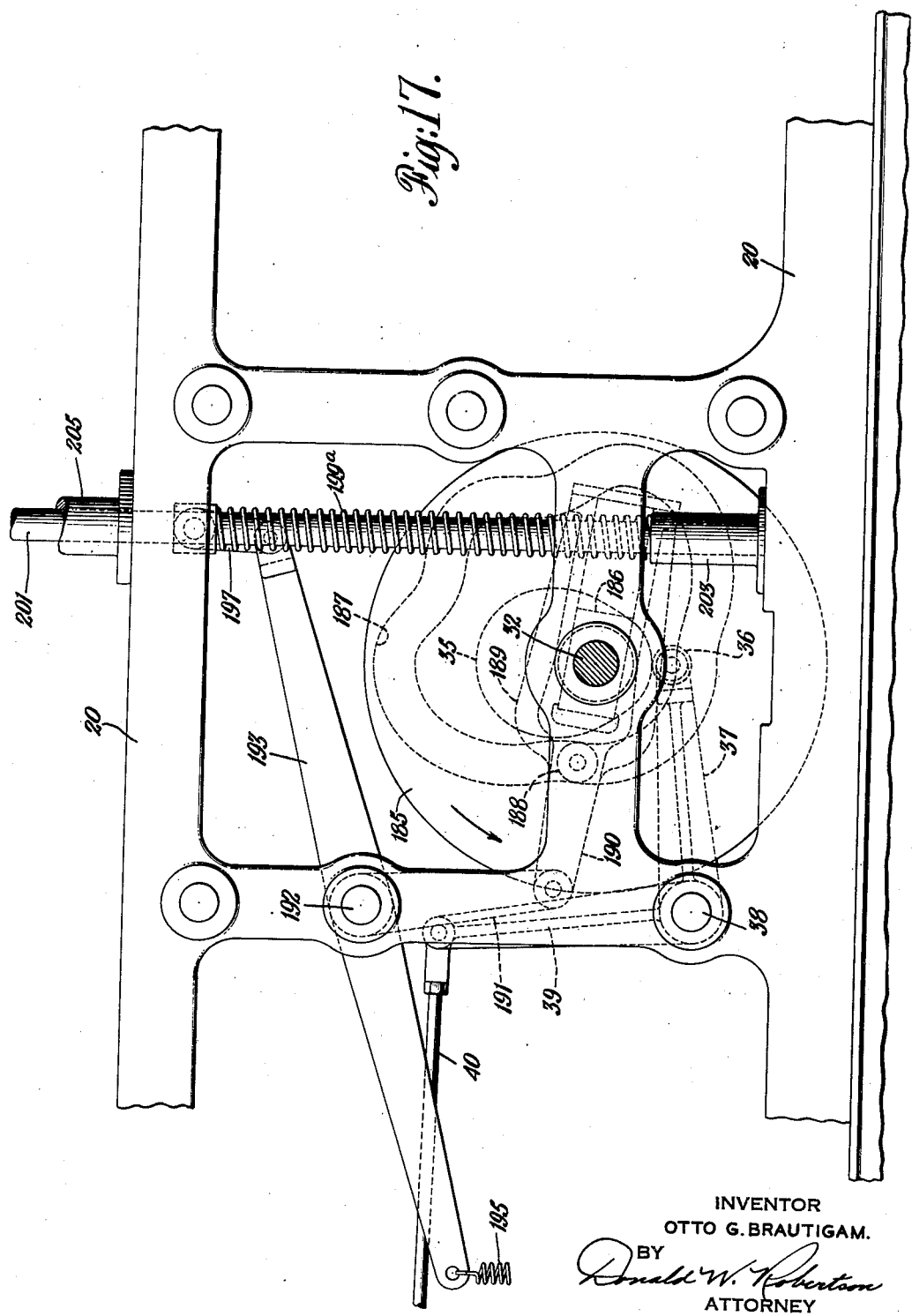

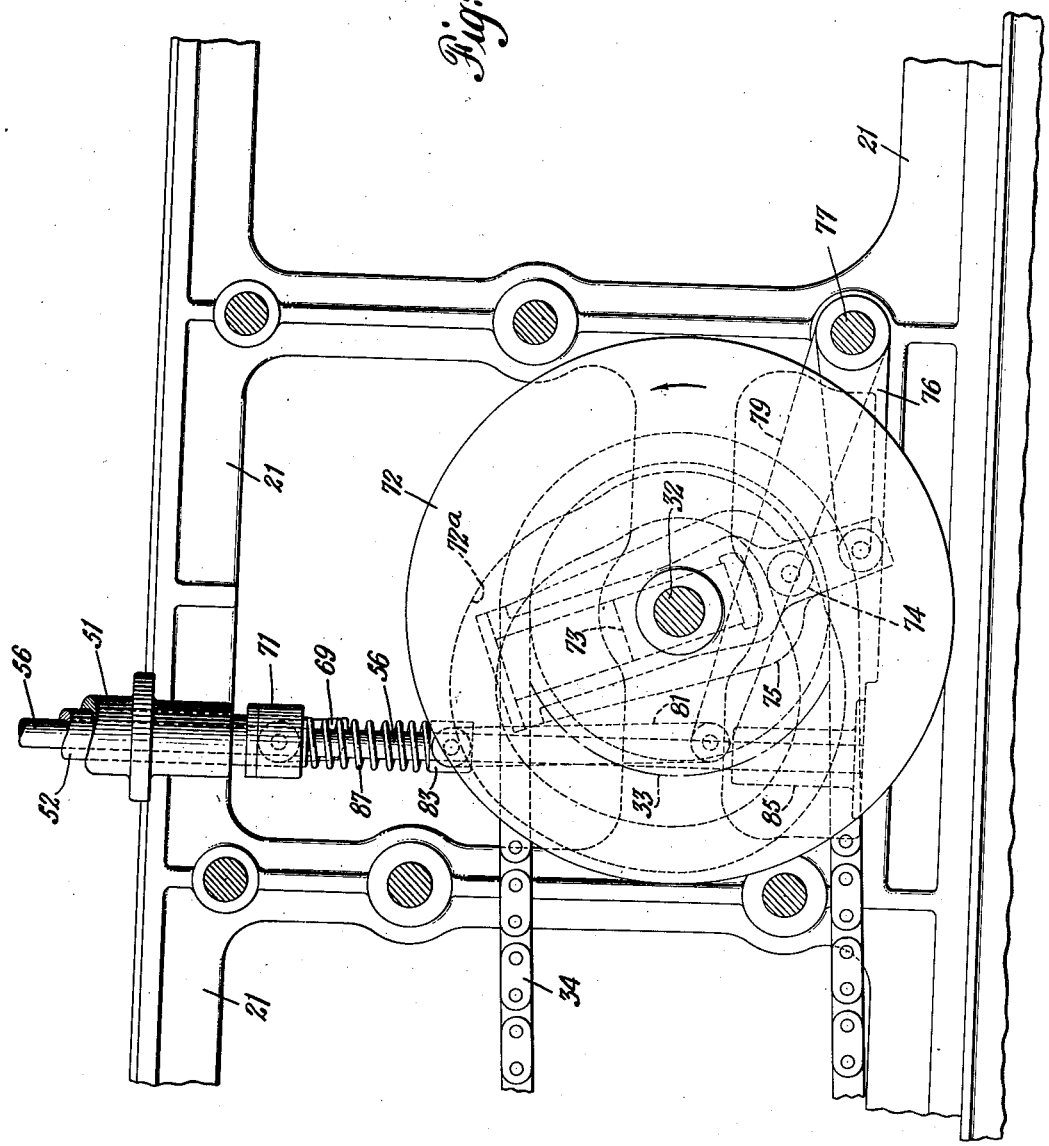

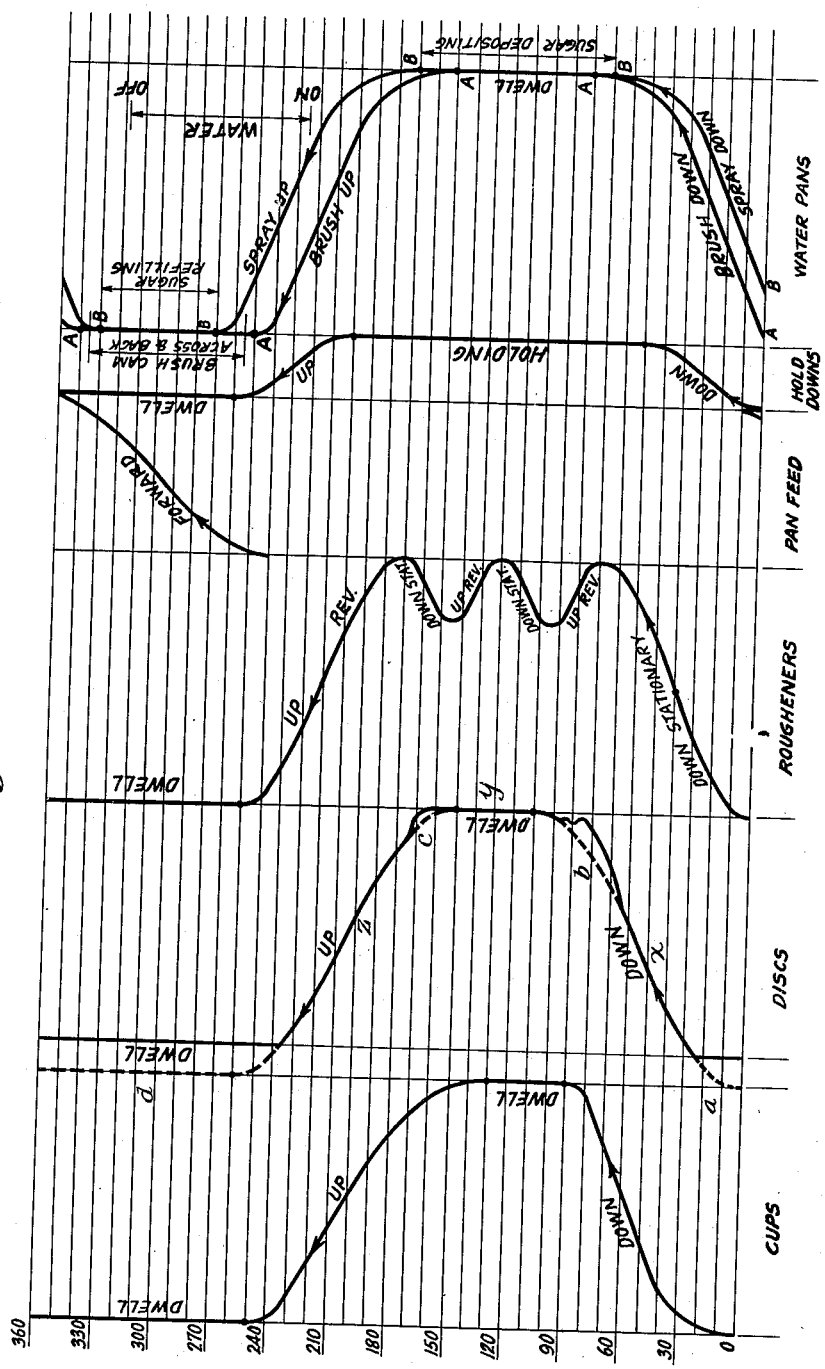

Patented Apr. 2, 1940

2,195,836

UNITED STATES PATENT OFFICE 2,195,836

MACHINE FOR MAKING CONFECTIONS

Otto G. Brautigam, Jersey City, N. J., assignor to Frank G. Shattuck Company, New York, N. Y., a corporation of Massachusetts Application April 14, 1939, Serial No. 267,825

23 Claims. (Cl. 107—26)

The invention relates to the molding of dough, and particularly to means for forming and shaping cookies and other confections.

In the molding of cooky dough and similar moist, sticky doughs or batters, considerable difficulty is experienced in preventing the dough from sticking to the molding means. It has been recognized that this difficulty can be minimized by wetting the mold or other forming means, but such wetting means as have been proposed heretofore are not altogether satisfactory. Particles of dough or a thin film of flour and butter, may adhere to the molds, and until the machine is stopped and the molds cleaned, the wetting means becomes relatively ineffective. Attempts have also been made to insure separation of the dough from mold members by employing stripping devices made, for example, of wire or thin metal strips. Such devices, while possibly of value in molding some kinds of dough, are not well adapted to use in forming dough for cookies and similar confections. They have a tendency to produce a rough surface on the dough, and particles of dough may even stick to the strippers, or they may become covered with a film. It is an object of my invention to provide a machine of the class described which will overcome these and other difficulties inherent in apparatus heretofore known.

More particularly, it is an object of my invention to provide dough forming apparatus having improved cleaning and wetting means such as to make it especially useful in the molding of cookies and similar confections.

Another object is to provide dough forming apparatus which is characterized by a more efficient coordination of movement between several mold members and a hold-down for the dough supporting means, and also between these elements and the cleaning and wetting devices.

A further object is to provide an improved forming device for roughening the surface of molded confection dough.

A further and more specific object is to provide dough forming apparatus having means for thoroughly wetting the face of a molding element just before it comes in contact with the dough, yet which prevents the liquid from splashing or running onto the dough.

Another specific object is to provide an improved mold unit and operating means therefor which assists in separation of the mold elements from the formed dough.

A general object is to provide apparatus of the class described which is relatively simple in construction, inexpensive to maintain, and which is rapid and efficient in operation. Other objects and advantages will appear as the description proceeds.

In the preferred form which I have selected to illustrate the invention, the machine embodies dough forming means comprising two reciprocatory mold elements and a reciprocatory roughening element, a dough supporting member and an intermittently acting hold-down element therefor, and means for coordinating the movements of these various elements. It also embodies cleaning and wetting means for the dough forming elements comprising members arranged to move at intervals into the paths of reciprocation of these elements. One of the features of my arrangement is that the cleaning and wetting means are arranged to operate during reciprocation of the dough forming elements. This produces a two-fold advantage: (1) It speeds up the operation of the machine, and (2) makes it possible to thoroughly wet the forming elements just as they are ready to be brought into contact with the dough. Another feature resides in the arrangement of the shields or troughs for the fluid, and of the operating mechanism therefor which permits them to be moved between the forming elements and dough supporting element during reciprocation of the former. Still another feature resides in the provision of resilient withdrawing means for one of the mold members to permit this member to lag behind until the suction between its surface and the surface of the dough can be broken without lifting the dough. A further feature resides in the provision of means for partially withdrawing a peripheral mold member in advance of the initial withdrawing action of a face mold member to permit air to enter around the face mold member and thereby assist in effecting its proper separation from the dough. A further feature resides in the provision of means for causing the face mold member to fall freely for a distance just before it strikes the dough and thereafter to be pressed positively against the dough. This causes the mold to strike the dough more than once in extremely rapid succession. I have discovered that this action is of particular value. Certain of the features which have been enumerated relate to the method as well as to the apparatus aspects of the invention. This is true, for example, of the steps of operating a mold member to cause it to fall freely during part of its stroke and thereafter to be pressed positively against the dough; and of the step of resiliently lifting the face mold after the peripheral mold has been raised to admit air to break the suction. These and other features of my invention will become apparent from the description of my preferred method and apparatus.

In the drawings:

Figs. 1 and 2 show the general arrangement of the apparatus, Fig. 1 being a side elevational view of the complete machine and Fig. 2 an enlarged view of the upper central portion of the machine with certain of the parts shown in section.

Figs. 3, 4 and 5 illustrate the cleaning and wetting means for the mold elements and part of the operating mechanism therefor. Fig. 3 is a vertical transverse sectional view taken on the line 3—3 of Fig. 2; Fig. 4 an enlarged vertical sectional view of the mold elements and cleaning and wetting mechanism therefor, the mold elements being shown in the retracted position which they occupy during actuation of the cleaning mechanism; and Fig. 5 a vertical sectional view taken on the line 5—5 of Fig. 4.

Fig. 7 is a vertical transverse sectional view taken on the line 7—7 of Fig. 1 and showing the hold-down members in the elevated position which they occupy during advancement of the dough-supporting means; and Fig. 8 is a view similar to Fig. 7 with the hold-down members in the clamping position which they occupy during the molding operations.

Figs. 9, 10, 11 and 12 illustrate the roughening elements which constitute one group of the dough-forming elements, and operating mechanism therefor. Fig. 9 is a vertical transverse sectional view taken on the line 9—9 of Fig. 1; Fig. 10 a bottom view of one of the roughening elements; Fig. 11 a plan view of the driving mechanism of Fig. 9; and Fig. 12 a side elevational view of the driving mechanism.

Fig. 13 is a plan view of the guiding mechanism for the dough-supporting means.

Figure 15:
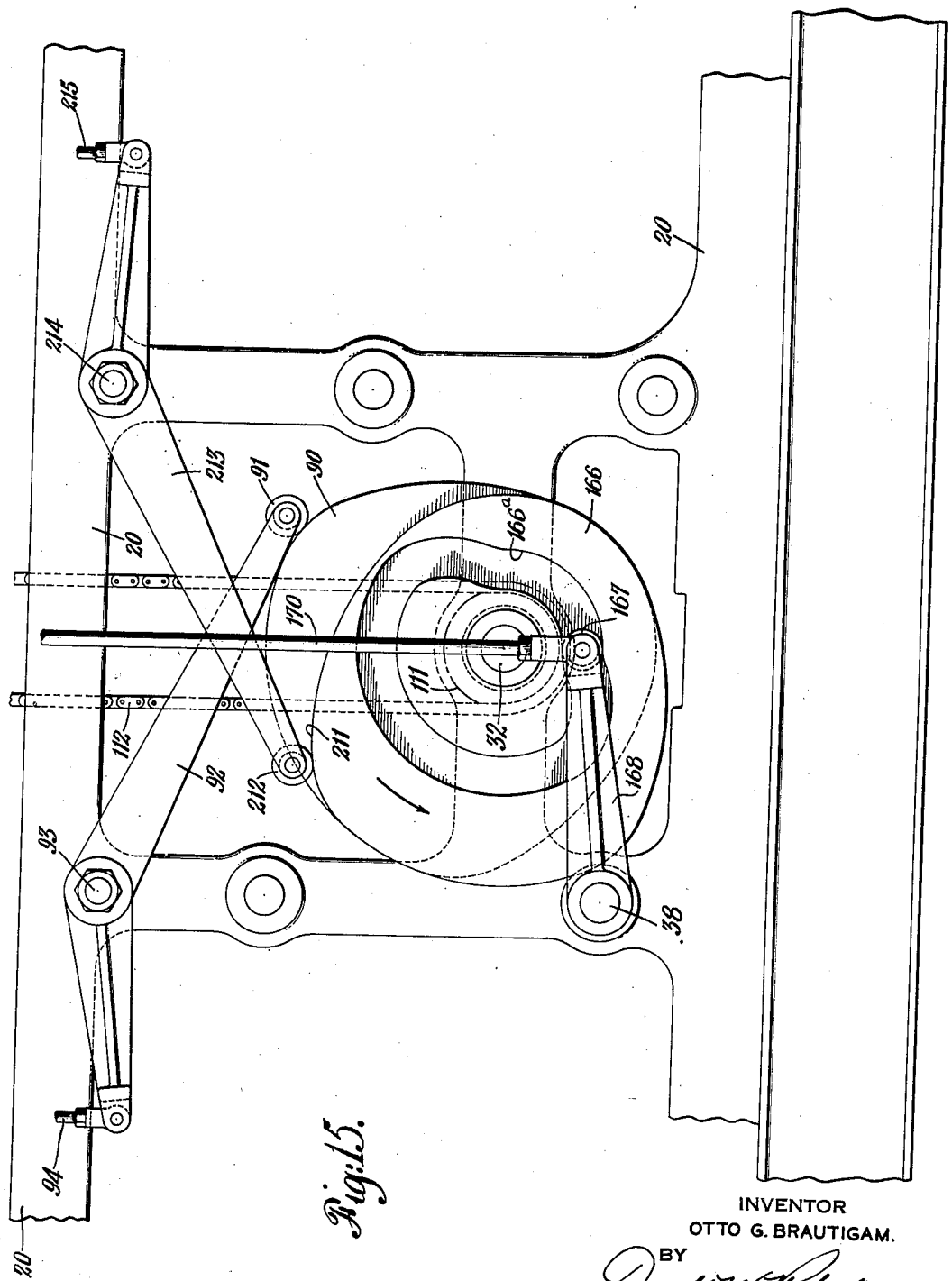

Figs. 14 to 18 inclusive illustrate the cam mechanism for coordinating the movements of the several dough-forming elements, hold-down elements, dough-supporting elements, cleaning and wetting elements and shield elements. Fig. 14 is a vertical transverse sectional view taken on the line 14—14 of Fig. 1. Fig. 15 is a side elevational view of the cam mechanism for controlling the hold-down members and the shield elements. Fig. 16 is a side elevational view of the cam mechanism for controlling the peripheral mold elements and wetting fluid supply. Fig. 17 is a similar view of the cam mechanism for controlling the movements of the roughening elements and the advancement of the dough-supporting pan. Fig. 18 is a similar view of the cam mechanism for controlling movements of the face mold member. This view also shows the main drive.

Fig. 19 is a diagram illustrating the coordination of the movements of the various elements.

Fig. 20 is a detail sectional view showing a modified form of face mold member; and Fig. 21 a similar view of a further modification.

Figure 1A:
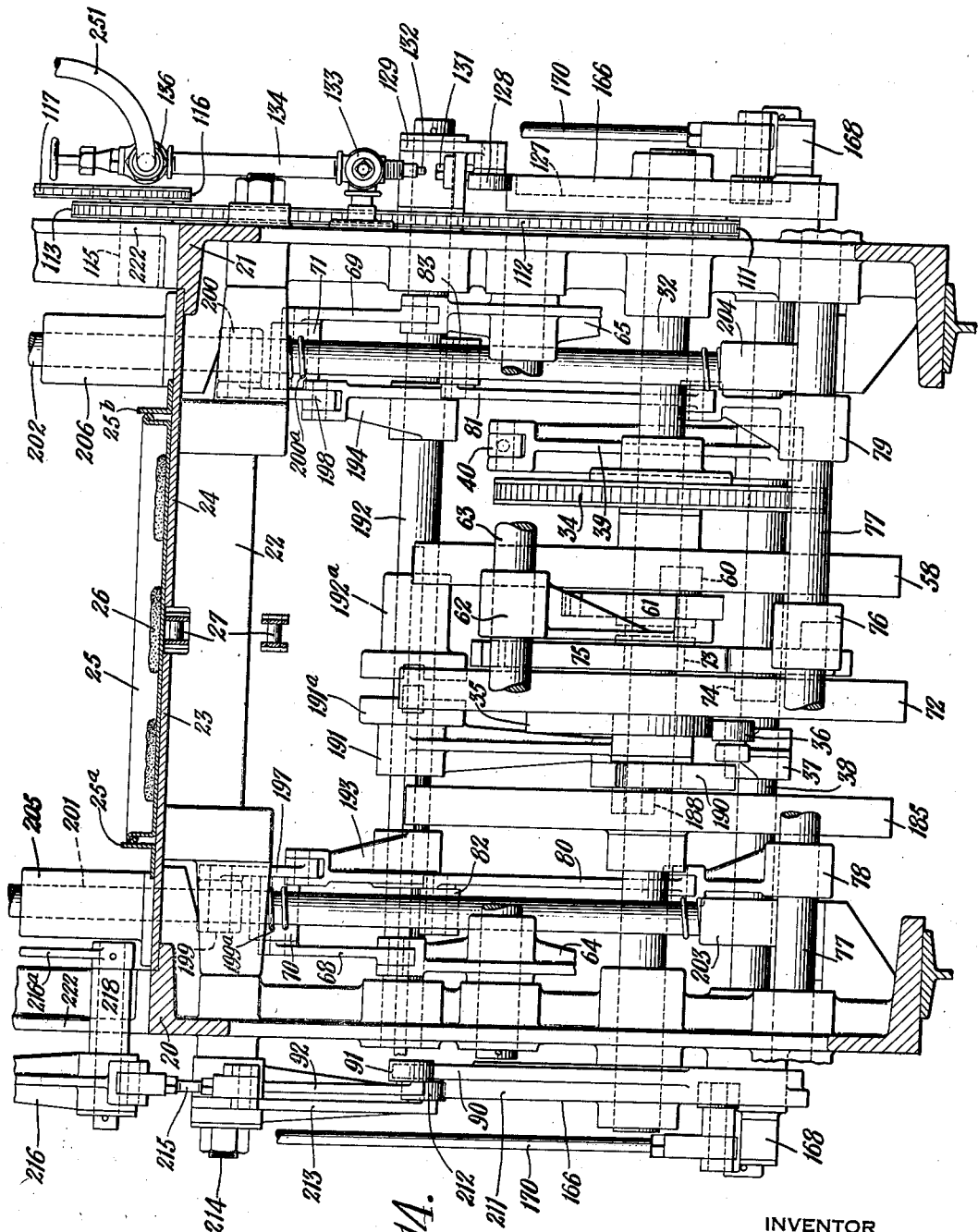

The dough to be formed is carried by a conveyor, or on pans supported by a conveyor, passing through the machine from left to right as viewed in Fig. 1. During its passage through the machine each piece of dough is subjected to the forming action of mold elements B and D and may also receive a coating or deposit of sugar at the station F. The portion of the mechanism which is indicated generally by the bracket A controls the movements of the water applicator and shield or trough for the mold elements B and the portion of the mechanism indicated by the bracket E controls the water applicator and trough for the mold elements or rougheners D. The portion of the mechanism indicated by the bracket C is the operating beam for the hold-down elements.

The forming means B may comprise a series of mold units each having a peripheral mold member and a face mold member. Similarly the forming means D may comprise an equal number of forming units. Either series of forming units may be used without the other while retaining certain of the advantages of my invention. Other advantages are obtained, however, by using the forming means B and D in conjunction, particularly since they can be arranged to operate with a single intermittently acting hold-down mechanism.

Figure 2:
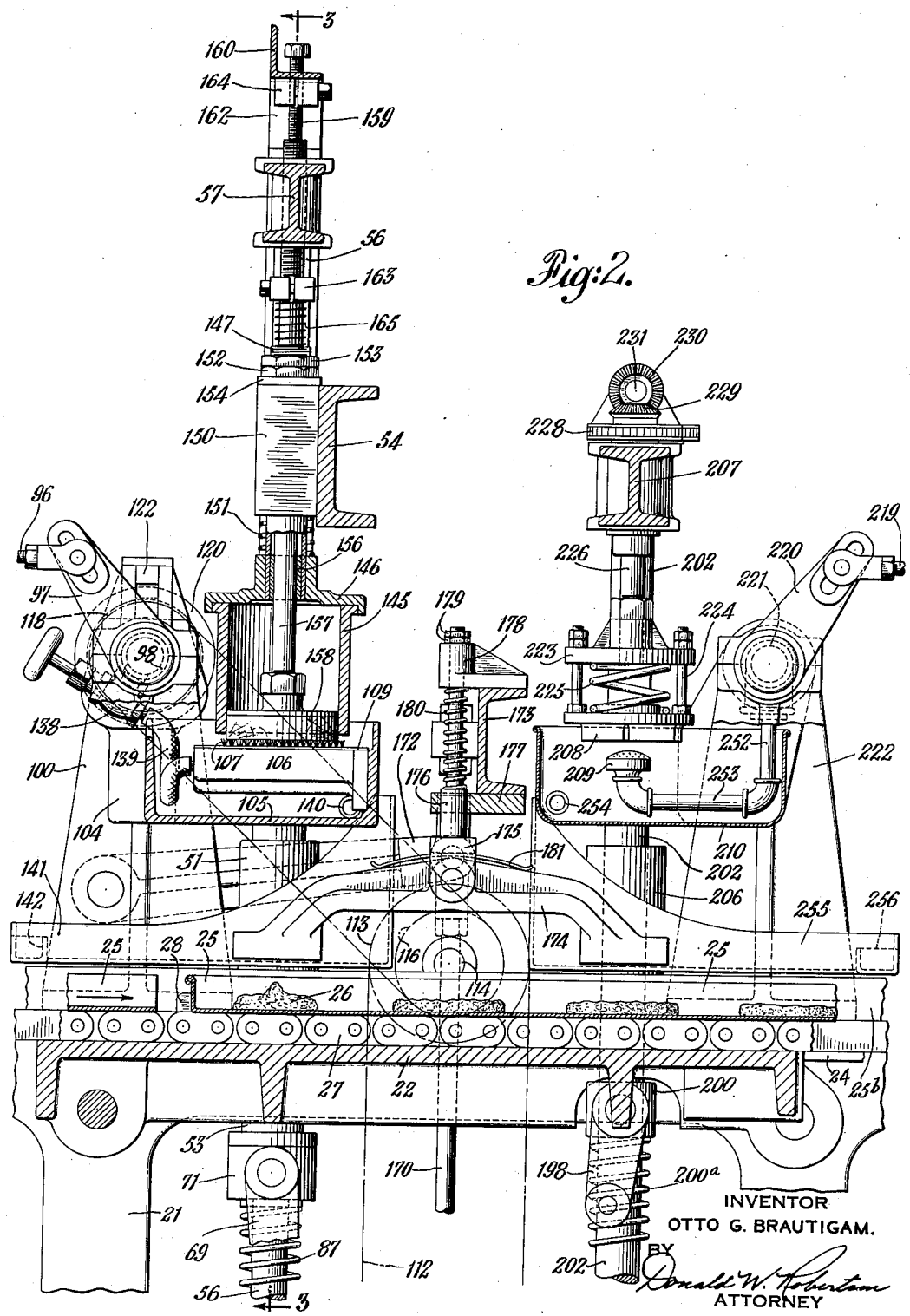

Referring to Figs. 1, 2 and 3, the machine selected for illustration comprises two main side supporting frames 20, 21. Secured to the side frames is a bed plate 22 extending across the machine. On the upper side of this plate and preferably extending the full length of the machine are a pair of surface plates 23, 24 forming a table for the dough-supporting pans or other dough supporting means. On this structure are mounted the several forming, holding, cleaning, wetting, and sugaring means A, B, C, D, E, F.

Pans 25 carrying dough deposits 26 thereon (Fig. 2) are advanced intermittently along the table 23, 24 by means of a continuous drive chain 27 which conveys the pans from left to right as viewed in Fig. 1. The drive chain 27 extends for the full length of the machine and preferably is provided with means for positively engaging the pans—such as the upwardly extending lugs 28 arranged at spaced intervals to engage the rear of the pans 25. Chain 27 passes over a sprocket 29 at the left end of the machine, thence over an adjustable sprocket 30 at the right end of the machine, over an idler 31, and finally back to the sprocket 29. The chain is driven intermittently by the sprocket 29 from a main shaft 32 carrying a sprocket 33 driven by a chain 34 from any suitable source of power, preferably coordinated with the drive unit of a suitable dough depositing mechanism. The shaft 32 drives all the moving parts of the machine. Also mounted on the shaft 32 is a periphery cam 35 (Fig. 17), rotation of which imparts motion to a cooperating cam roller 36 carried by an arm 37 mounted on a shaft 38. Motion of the shaft 38 in turn moves an arm 39 carried thereon and to which is connected a rod 40. To the other end of the rod 40 is fastened a swinging yoke 41 mounted on a shaft 42. This yoke carries a spring-pressed pawl 43 engaging a ratchet wheel 44 also mounted on the shaft 42. Also secured to this shaft is a spur gear 45 meshing with a pinion 46 mounted on the shaft 47, this being the shaft which carries the chain sprocket 29 to which reference has been made. The intermittent motion imparted by this mechanism advances the pans 25 in the direction indicated by the arrow in Fig. 2. In this view one of the pans 25 is shown in one of its positions of rest preparatory to operation of the hold-down member and forming elements. During the advancement of the pans 25, they are held in proper alignment on the table 23, 24 between a fixed guide 25ª (Figs. 9 and 13) on one side of the machine and a spring-pressed sectional guide 25<sup>b</sup> on the other side. The spring-pressed guide 25<sup>b</sup> compensates for variations in the width of the pans, holding them against fixed guide 25<sup>a</sup>.

The dough deposits 26 are so spaced on the supporting pan 25 with relation to the movements of the pan as to come to rest first under the dough-forming means B and later under the dough-forming means D. The dough-forming means B may consist of one or more mold units each comprising a peripheral mold element and a face mold element. In the construction illustrated, there is a series of three of these units (Fig. 3). Since these units are alike in construction, only one of them will be described. This mechanism is illustrated in Figs. 2, 3, 4, 5, and 6. On the side frames 20 and 21 each side of the machine are mounted standards or bearing brackets 50 and 51 which carry vertical operating shafts 52 and 53 on the upper ends of which is mounted a beam 54 which conveniently may be of channel form and which spans the operating table. This beam effects the vertical reciprocation of the peripheral mold elements which will be described subsequently. Within the shafts 52 and 53 and slidably arranged with respect thereto are a pair of smaller shafts 55 and 56 which support a cross member 57 likewise spanning the table, this cross member effecting the vertical reciprocation of the face mold members.

Referring again to the main drive shaft 32, there is mounted on this shaft as shown in Fig. 16 a face cam 58 and a pivotal bearing block 59. The cam 58 controls the operation of the peripheral mold-forming elements. It is provided on its face with a groove 58<sup>a</sup> engaging a roller 60 which is mounted on a yoke 61 arranged to slide freely over the bearing block 59. As the radial position of the roller 60 changes with rotation of the cam 58, the yoke 61 is carried along with it. To the end of the yoke 61 is fastened an arm 62 secured to a shaft 63 which in turn carries a pair of double arms 64, 65 to one of the ends of which are fastened counterbalance springs 66, 67. These springs conveniently are anchored to the side frames 20 and 21. The other ends of the arms 64, 65 are connected to links 68 and 69 (Fig. 14) secured to collars 70, 71 fastened to the shafts 52 and 53.

Referring to Fig. 18, there is shown another face cam 72 secured to the main drive shaft 32 and an adjacent bearing block 73. This mechanism is for operating the face mold members of the dough-forming means B. A cam roller 74 engages a groove 72<sup>a</sup> of the cam, this roller being mounted on a yoke 75 which is arranged to slide freely over the bearing block 73. Changes in the position of the cam roller 74 produced by rotation of the cam 72 imparts motion to the yoke 75. At the end of the yoke is pivoted an arm 76 which is secured to the shaft 77. Also secured to the shaft 77 (Figs. 14 and 18) are a pair of arms 78, 79 to the ends of which are pivoted links 80 and 81. These links in turn are pivotally secured to collars 82 and 83 which are fastened to the shafts 55 and 56. The lower ends of the shafts 55 and 56 have a guiding engagement with sleeve brackets 84 and 85 which may conveniently be fastened to the side frames 20 and 21. Interposed between the collars 70—82 and 71—83 are springs 86 and 87 which take up any lost motion between the rods 52, 53 on the one hand and 55, 56 on the other. This insures proper correlation of the movements of the crossbeams 54 and 57 and therefore between the movements of the face mold members and periphery mold members which are controlled thereby. Rotation of the cams 58 and 72 through the linkages which have been described alternately raises and lowers the crossbeams 54 and 57, imparting a reciprocatory motion to the peripheral and face mold members. In Fig. 2 these members are shown in their raised position and in Fig. 6 they are shown in their lowered position.

The movements of the cleaning units, fluid applicators and shield for the face mold members are controlled by a periphery cam 90 mounted on the main drive shaft 32 (Fig. 15). The cam 90 engages a roller 91 attached to an arm 92 pivoted on the shaft 93. The other end of this arm is secured to a connecting link 94 attached to one end of a bell crank arm 95 (Fig. 1). The bell crank is pivoted on a bracket 95<sup>a</sup> secured to the side frame 20 and operating against the tension of a spring 95<sup>b</sup>. Secured to the other arm of the bell crank 95 is a connecting link 96 which in turn is secured to an arm 97 carried on one end of the hollow shaft 98 (Figs. 2 and 3). This shaft is rotatably mounted in bearing standards 99, 100 at either side of the machine. Movement of the arm 97 imparts rotation to the shaft 98. Affixed to the shaft 98 are a pair of bearing blocks 101, 102 on which are slidably mounted a pair of depending brackets 103 and 104. To the lower part of these brackets is secured a shield which is preferably in the form of a water pan or trough 105. Above this shield are arranged the cleaning and wetting units 106 (Figs. 3 and 4), the number of which may correspond to the number of molding units. In my preferred construction each of the cleaning and wetting units comprises a brush 107 having a series of openings 108 which permit the water or other liquid to flow against the face mold member 158. The brush 107 is resiliently urged against a retaining plate 109 as by means of springs 110. The cam 90 and associated operating mechanism which have been described oscillates the hollow shaft 98 at periodic intervals in order to move the cleaning units with their water applicators and shield or trough into and out of the vertical paths of reciprocation of the molding means.

I shall now describe the mechanism for imparting lateral motion to the brushes to scrub the face of the mold member 158. Referring to Fig. 15, I have shown a sprocket 111 mounted on the main drive shaft 32. This sprocket drives a chain 112 which in turn rotates a sprocket 113 (Fig. 14) pivoted on the shaft 114 conveniently secured to the side frame 21 in the bracket 115. Also mounted on the shaft 114 is another sprocket 116 (Figs. 2 and 14) engaging a chain 117 which passes around a sprocket 118 (Fig. 5) secured to a sleeve 119 which is freely mounted on the hollow shaft 98. Secured to or forming a part of the sleeve 119 is a cam 120, the cam groove 120<sup>a</sup> of which engages a cam roller 121 mounted on a sliding bar 122. Rotation of the cam causes the bar 122 to reciprocate longitudinally of the shaft 98. The bar 122 is provided with a pair of depending lugs 123, 124 (Figs. 3 and 5) engaging lugs 125 and 126 on the brackets 103, 104 which, as previously described, support the shield or trough 105 to which the cleaning and wetting units 106 are secured. This mechanism causes the brushes 107 to reciprocate from left to right as viewed in Fig. 3 to scrub the faces of the mold elements 158.

Referring again to Fig. 16, I shall now describe the mechanism for controlling the flow of the cleaning fluid. A cam 127 is secured to the main drive shaft 32 and engages a cam roller 128 carried by an arm 129 pivoted to the shaft 192. The motion imparted by this cam causes a stud 131 on the arm 129 to contact a plunger 132 to open and close a valve 133 and admit water or other fluid from an outside source to a pipe 134. A valve 135 controls the flow of water from the pipe 134 to the flexible conduit 137 and a valve 138 controls the flow of water from the pipe 134 to a flexible conduit 251 leading to the sprayer or other wetting means 269 to be described later. The flexible conduit 137 is connected to one end of the hollow shaft 98, the other end of which is closed. A flexible conduit 139 connects the shaft 98 to the valve 138 and cleaning unit 106. The trough or pan 105 is provided with a drain 140 leading to a collecting trough 141 which discharges the cleaning liquid through the trough 142.

With reference to Figs. 3 and 4, I shall now describe the construction of the peripheral mold members or cups 145. In the construction illustrated, there are three of these cups and they are slidably mounted on the crossbeam 54. These cups preferably are removably attached to caps 146 so that they may be removed as may be desired in the formation of confections of a variety which do not require the use of a peripheral mold member or so that other forms of cups may be substituted therefor. Inasmuch as the construction of the peripheral mold members and the spraying mechanism therefor is the same for all units, only one of them will be described. Extending upwardly from the cap 146 is a hollow guide shaft 147 slidably mounted in bushings 148 and 149 held in a sleeve 150 secured to or forming a part of the crossbeam 54. Surrounding the shaft 147 between the sleeve 150 and the cap 146 is a compression spring 151 which resiliently holds the cup 145 against the surface of the pan 25 when the parts are in the position shown in Fig. 6. Adjustment of the withdrawn position of the cup 145 is provided for in the construction shown by a nut and lock nut 152, 153 bearing against the collar 154 under the compression of the spring 151, the nuts engaging the upper end of the guide shaft 147 and the collar 154 bearing against the upper end of the sleeve 150.

With further reference to Fig. 4, the preferred construction of the actuating and adjusting means for the face mold element or forming disc 158 will now be described. This forming disc 158 is preferably faced with wood arranged with its grain normal to the forming surface, or with some other material to which a film of water will adhere readily. The disc 158 is carried by a shaft 157 and is slidably mounted within the cup 145. At its upper end the shaft 157 passes through the crossbeam 57 and engages an adjustable stop screw 159 carried by a transverse frame member 160 mounted on vertical frame members 161 and 162 fastened to the side frames 20 and 21. As the crossbeam 57 moves down it engages an adjustable collar 163 clamped on the shaft 157 which causes the forming disc 158 to be lowered into the position shown in Fig. 6. It will be understood that during this lowering action the crossbeam 54 also is lowered although the distance between the two crossbeams 54 and 57 varies during both the lowering and raising actions. Thus during the lowering of the cup and disc, the cup moves down ahead of the disc until it comes into contact with the upper surface of the pan 25 under the compression of the spring 151. This spring takes up any slight downward motion of the crossbeam 54 which may occur after the cup has come into contact with the pan. Also, during the withdrawal of the cup and disc, the cup precedes the disc. Actually, the lifting force for the disc is imparted by the crossbeam 54 through the spring 165 acting on the collar 163. The crossbeam 57, however, controls the rate of withdrawal of the disc through its restraining action on the collar 163, the spring 165 being compressed during that portion of the cycle in which the elevating crossbeam 54 precedes or leads the elevating of the crossbeam 57. When the shaft reaches the position shown in Fig. 4, its upper end abuts the adjustable stop member 159. If desired, a clamp 164 may be provided to hold the stop 159 in its adjusted position. The spring 165 takes such further upward movement of the crossbeam 54 as may occur after the shaft 157 has come up against the stop 159. The stop 159, when properly adjusted, insures the desired degree of pressure between the brush 107 and the face of the disc 158.

Figure 6:
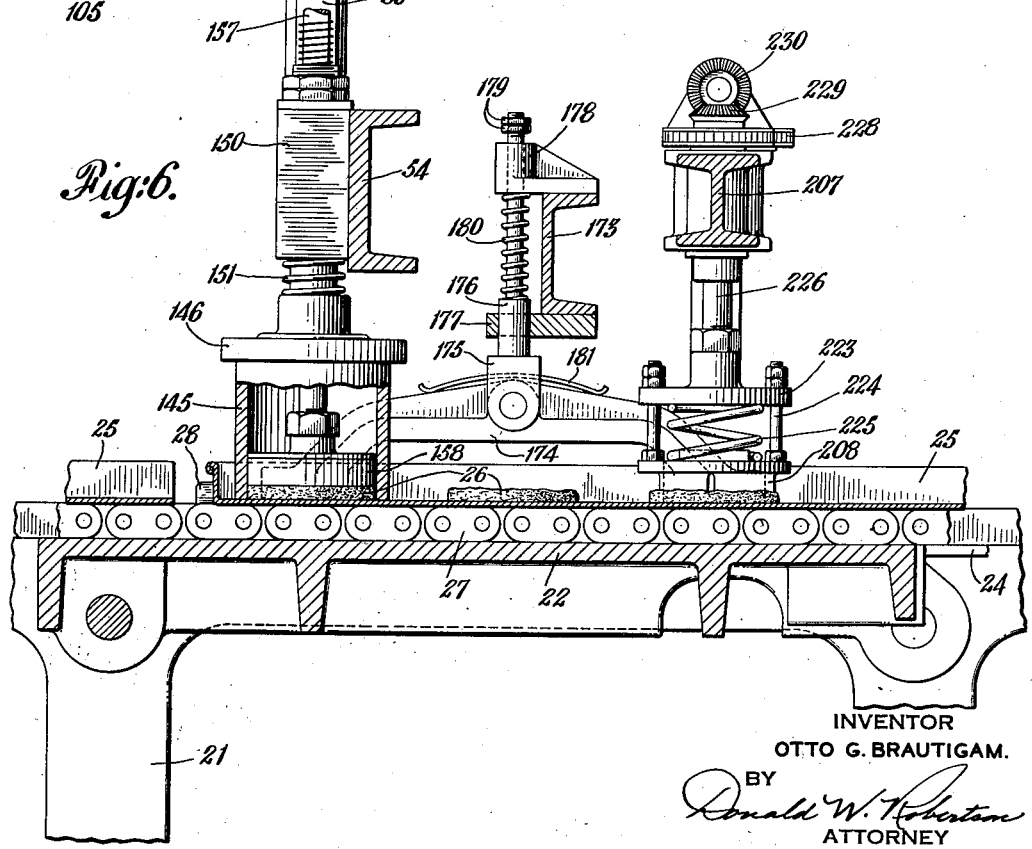
Fig. 6 is a view similar to Fig. 2 but with the several dough forming elements and hold-down members shown in their operating positions.

The clamping means C for holding the pan 25 in each of its several positions of rest as it advances through the machine will now be described with reference to Figs. 2, 6, 7, 8 and 15. Figs. 2 and 7 show the hold-down member in its elevated position and Figs. 6 and 8 show it in its clamping position. A face cam 166 (Figs. 14 and 15) is secured to the shaft 32 at either side of the machine. As shown, the face cam 166 constitutes a part of cams 99 and 211 at one side of the machine and a part of the cam 127 at the other side. Engaging the grooves 166a of these cams are cam rollers 167, each of which is pivoted to an arm 168 which in turn is pivotally mounted on a shaft 38. Also pivotally connected to each roller is a connecting rod 170 the other end of which is connected to the lower end of a pivot block 171 (Fig. 7). Pivoted to each of these blocks is an arm 172 (Fig. 1) which is pivotally mounted on standards 99 and 100 located at either side of the machine. A crossbeam 173 which may conveniently be of channel cross section, is secured to the blocks 171. This crossbeam carries several hold-down members 174 spaced transversely of the pan 25. Each hold-down member 174 is held in a clevis 175 provided with a shaft or other connecting portion 176 passing through a guide 177 affixed to the crossbeam 173. An extension of the shaft 176 passes through a bracket 178 at the top of the crossbeam to receive a pair of lock nuts 179 providing means for adjusting the hold-down member against the compression of a spring 180 surrounding the shaft 176 bearing against the bracket 178 and against a shoulder on the shaft. When the several hold-down members 174 occupy the position shown in Figs. 6 and 8, the compression of the springs 180 against the shoulders of the shafts 176 maintains the hold-down members tightly but resiliently against the pans 25 to hold the latter in position while the confections are being formed and to press out the buckles in the pan. If desired, a leaf spring 181 or other equivalent means may be inserted through the clevis 175 with its ends bearing against either leg of the hold-down member 174 to maintain it in a horizontal position when it is raised as shown in Figs. 2 and 7. These hold downs not only hold the pans in position but they also flatten out the buckles in the pan caused by the baking heat and also hold until after the cooky is formed and released.

With reference to Figs. 1, 2, 6, 9, 10, 11, 12, 14, and 17, I shall now describe a further dough-forming or molding unit which in my preferred construction is used in conjunction with the mold members described hereinabove. This forming unit consists of what will be referred to herein as a roughening means. This is the means which has been indicated generally by the bracket D in Fig. 1. The cam means for controlling the operation of the rougheners is illustrated in Fig. 17 and consists of a face cam 185 with an adjacent bearing block 186 mounted on the shaft 32. A groove 187 in the cam 185 engages a cam roller or follower 188 which is pivoted on a yoke 189 having a slidable engagement over the bearing block 186. The direction of rotation of the cam 185 is indicated by the arow in Fig. 17. The yoke 182 has an extended arm 190 pivoted to an arm 191 which is carried loosely on the shaft 192. A clutch member 192ᵃ (Fig. 14) is slidably keyed on the shaft 192 for engagement with a clutch 191ᵃ secured to or forming a part of the arm 191. The shaft 192 also carries a pair of double arms 193 and 194. Springs 195 and 196 are secured respectively to one end of each of the double arms, these springs being secured to a fixed support which may conveniently be the bottom webs of the main frames 20 and 21. The other ends of arms 193 and 194 are connected to links 197 and 198 which in turn are connected to collars 199 and 200 secured to shafts 201 and 202. The lower ends of these shafts are guided in sleeve brackets 203 and 204. Surrounding these shafts are springs 199ᵃ and 200ᵃ which, at one end, bear against the collars 199 and 200 and at the other bear against the brackets 203 and 204. These springs prevent any lost motion in the linkage which has been described. The upper part of the shafts 201 and 202 pass through sleeve brackets 205 and 206 which are fastened to the table of the machine (Fig. 9). The upper ends of the shafts 201 and 202 carry a crossbeam 207 on which are supported the roughening units 208, the number of which should correspond with the number of mold units. Liquid applicators are arranged to be brought underneath the rougheners when they are withdrawn from the pan 25. These applicators may consist of spraying devices 209. Arranged between them and the pan 25 when the parts are shown in the position in Fig. 9, is a shield or water pan 210.

The movement of the water applicators and shield or water pan into and out of the vertical path of reciprocation of the roughening units may be controlled by means similar to that which has been described with reference to the cleaning units 106 and pan 105. Referring to Fig. 15, the periphery cam 211 which may conveniently form a part of the cam 166 previously described, is secured to the main shaft 32. The cam 211 engages a cam follower or roller 212 rotatably mounted on a bell crank lever 213 pivoted on the shaft 214. At the other end of the bell crank lever is a connecting rod 215 (Fig. 1) which in turn is pivoted to another bell crank lever 216 mounted on a shaft 217 carried by a bracket 218 fastened to the table of the machine. The shaft 217 carries another arm 216ᵃ to the end of which a spring 216ᵇ is secured to hold the cam roller 212 against the cam 211. The upwardly extending arm of the bell crank lever 216 is pivotally secured to a connecting rod 219 which in turn is pivoted to an arm 220 rigidly secured to a hollow shaft 221 pivoted in a pair of standards or bearing blocks 222 mounted on the table at either side of the machine. The hollow shaft 221 carries the sprayers 209 and shield or water pan 210.

With particular reference to Figs. 6, 9, 10, 11 and 12, the construction of the preferred form of roughening unit and its driving means will now be described. As the cross-beam 207 moves downwardly, the roughening elements 208 are brought into the position shown in Fig. 6. The elements 208 are supported from the brackets 223 by connecting bolts 224. Compression springs 225 positioned between the elements 208 and brackets 223 resiliently urge the roughening elements to the limit of the downward movement permitted by the connecting bolts. The brackets 223 are fastened to shafts 226 rotatably supported by the crossbeam 207. Sprockets 227 are keyed to the shafts 226 and engage a continuous chain 228 in such a manner as to impart rotative motion to the shafts 226. A bevel gear 229 is keyed to one of the shafts and meshes with a bevel gear 230 keyed to a shaft 231 carried in a bearing 232 secured to the crossbeam 207. Secured to the other end of the shaft 231 is a ratchet wheel 233 which is driven by a gear train of which one gear 234 engages the teeth 235 of a rack bar 236. This bar is pivoted at 235ᵃ to a bearing sleeve 206 and has a slot 237 engaging a stud 238 limiting its pivotal motion against the tension of a spring 239 fastened to the upper end of the bar and to the standard 222. The gear 234 is rotatably mounted on a shaft 240 mounted on an extension 241 of the crossbeam 207. Also on the shaft 240 is a plate 242 (Fig. 12) carrying at its upper end a gear 243 on a shaft 244, this gear meshing with the gear 234. Keyed to the same shaft as the gear 243 is another gear 245 meshing with a pinion 246 loosely mounted on the shaft 231. Affixed to the gear 246 and rotatable therewith is an extending ear 247 carrying a pawl 248 engaging the ratchet 233. The plate 242 is provided with a slot 249 and clamping bolt 250 which holds the gear 245 in mesh with the pinion 246 while allowing for adjustment to permit a change in the sizes of the gears. As the crossbeam 207 moves downwardly, the gear 234 engages the teeth of the rack 236 producing counter-clockwise rotation of the gear 234 (as viewed in Fig. 12), clockwise rotation of the gears 243 and 245 and counter-clockwise rotation of the pinion 246 and pawl 248, causing the pawl to over-ride the ratchet 233. As the crossbeam 207 moves upwardly, rotation of the gears is reversed and the pawl engages the ratchet to impart rotation to the shafts 226 and roughening elements through the driving connections previously described. Reciprocation of the crossbeam 207 thus changes the position of the roughening elements 208 so as to alter the forming effect on the surface of the formed dough carried by the pan 25. The roughening elements 208 may be of any desired form but I have found that very good results are obtained with cups 208ᵃ of the form shown in Fig. 10 which preferably are of concave spherical form and arranged at unequal distances from the axis of rotation of the element 208. When the parts are in the position shown in Fig. 2, the sprayers 209 are directed toward the forming surfaces of the cups 208ᵃ. The valve 133 previously referred to admits water to the flexible connection 251 (Fig. 16) through which it reaches the hollow shaft 221 which in turn is connected to the sprayer heads by pipes 252 and 253. The pan 210 collects the water which then passes out through the drain 254, and the troughs 255 and 256. This roughening device is only required on a certain kind of cooky. It may be disconnected by disengaging clutch 192ª (Fig. 14). The sprayers 209 and their shield or pan should then be made inoperative by disconnecting link 219 (Fig. 1) and the fluid shut off by closing valve 136 (Fig. 16). Spring 195 (Fig. 1) which acts as a counterbalance when the device is operating, serves to retain it in the upward position when inoperative.

If desired, the machine may be provided with a sugaring device F providing means for depositing sugar on the surface of the formed pieces of dough as they leave the machine. The hopper of such a device is indicated generally at 260, the hopper outlet being operated by a link 261 and connecting rod 262 secured to the arm 218ª on the shaft 217.

In Fig. 20, there is illustrated a modified form of face mold member which may be used in place of the element 158 shown in Fig. 4. The faces of these members are preferably formed of wood as, for example, by attaching a block 263 to a flanged supporting bracket 264 attached to the end of the shaft 157. The block 263 is provided with an annular or peripheral recess 265. This groove forms a thickened edge on the confection.

A further modification is illustrated in Fig. 21 in which the face block 266 is formed with a face 267 of slightly conical form. If desired, this block may also be provided with a peripheral groove 268 beginning at the edge of the block and joining the conical surface. The conical surface assists in spreading the dough laterally during the forming operation and produces a confection which not only possesses a distinct and attractive appearance but avoids the production of an irregular or thin edge portion.

The operation of the machine will be fully understood from the foregoing description. It may be helpful, however, to summarize the principal steps of its operation with particular reference to Fig. 19 which illustrates diagrammatically the coordination of the movements of the several forming members, hold-down members, and cleaning and wetting means. In reading the diagram, the ordinates are cycle periods in degrees based on a complete cycle of 360°, and the abscissae are distances representing vertical reciprocation with the upper limit at the origin. Thus downward and upward travel are to the right and left respectively. Beginning at the left of the diagram, the first curve indicates one complete cycle of operation of the peripheral mold members or "cups" 145. Their motion consists essentially of vertical reciprocation with periods of rest or dwell at the limits of the downward and upward motions. Beginning at the origin, the curve shows first a period of acceleration, then a relatively rapid period of downward travel with sharp deceleration at the end terminating in a dwell from 90° to 130°. Thereafter, there is a period of acceleration upwardly followed by a period of upward travel at substantially constant velocity, and finally a rather sharp deceleration terminating in a period of dwell beginning at 350 and extending to 360°.

The next full line curve indicates one complete cycle of operation of the face mold members or "discs" 158. The composite curve which is obtained by combining the dotted line portions a, b, c, and d with the full line portions x, y, and z indicates a cycle of operation of the crossbeam 57 which, in cooperation with the crossbeam 54 and stop 159, controls the movements of the discs. A new point of origin is used for the abscissae to avoid overlapping and confusion of the curves. The portion of the full line curve which lies between about 240° and about 20° represents the upper limit of travel of the discs as determined by the position of the adjustable stop 159. As the crossbeam 57 begins to accelerate from the 0° position it moves downwardly at a more rapid rate than the crossbeam 54, and at about 20° it engages the collar 163. If desired, the crossbeam 57 may overtake the crossbeam 54 and come sufficiently close to it to compress the spring 165. From the point at which the crossbeam 57 engages the collar 163 (or at about 20° as illustrated in Fig. 19), it positively controls the downward movement of the disc 158, the collar 163 being resiliently held against the crossbeam 57 by the crossbeam 54 acting through the spring 165. This condition obtains until, between about 60° and 70°, the velocity of the crossbeam 54 becomes greater than that of the crossbeam 57 by reason of a deceleration of the latter. At about this point the crossbeam 57 again separates from the collar 163 and the disc 158 continues ahead at a velocity more nearly approaching that of the crossbeam 54 until it strikes the dough. I have found that under certain conditions of operation, the disc 158 will actually rebound slightly after striking the dough and may even vibrate up and down more than once before the collar 163 is again overtaken by the crossbeam 57 to exert the final pressing action on the dough. (The collar 163 is adjustable to regulate the thickness of the confection.) In Fig. 19 this condition is shown with some exaggeration. Actually, the up and down vibration of the freely falling disc appears to be extremely rapid and of very small extent, the whole action taking place so rapidly as to make accurate measurement difficult. According to the tests which I have conducted, however, this action is distinctly beneficial and makes it possible to more nearly approach the conditions which obtain when making cookies by hand. The action may be described as one which consists in positively controlling the movement of the disc during part of its downward travel toward the dough supporting means, releasing it from the controlling means as it approaches the supporting means (and after the shield 105 has swung aside), and again positively controlling the movement of the disc at the end of its travel toward the dough. It will be observed from the dotted line portion c of the curve that the beam 57 begins to move upwardly at about 150°, or 20° after the cup has started to rise. As soon as the cup starts to rise, air is permitted to enter around the edges of the formed dough to break the suction and permit separation of the disc therefrom. During this initial upward movement of the beam 54, the spring 165 is compressed until sufficient lifting force is applied to the disc to pull it away from the dough. This allows the disc to lag behind the beam 54 as is shown by the full line portion of the curve which lies opposite the dotted line portion c just referred to. This action automatically compensates for differences in adhesiveness of different kinds of batter, and for temperature changes. When the disc finally separates from the dough, it snaps upwardly until it catches up with the beam 57. It will be understood that during this interval the beam 54 preferably is rising at a somewhat faster rate than the beam 57, as may be seen from a comparison of the curves for the cups and discs. Therefore, during this rising movement the discs 158 retire into the cups 145. At about 240° the disc-supporting shaft 157 comes up against the stop 159, the cups 145 continuing upwardly a short distance to expose the faces of the discs, and the beam 57 continuing upwardly as shown by the dotted line in the diagram until it reaches the limit of its upward movement at about 260° where it remains until 360°. (See the dotted line portion d of the curve.)

By comparing the curves for the cups and discs, it will be seen that the latter have a somewhat shorter path of reciprocation than the former; also, from Figs. 4 and 6 it will be seen that the upper and lower limits of travel are not the same for the cups and discs. Thus with the parts in the position shown in Fig. 4, the lower edge of the cups 145 is above the face of the discs 158 whereas with the parts in the position shown in Fig. 6, the lower edge of the cups is below the face of the discs. The upper limit of travel of the cups 145 is determined by the position of the crossbeam 54 and the upper limit of travel of the discs 158 by the position of the adjustable stops 159. The lower limit of travel of the cups 145 is determined by the surface height of the pan 25 against which they are resiliently pressed by the crossbeam 54 acting through the springs 151, and the lower limit of travel of the discs 158 is determined by the position of the crossbeam 57 acting against the adjustable collars 163 which are resiliently held against the crossbeam 57 by the crossbeam 54 acting through the springs 165. The cups, when resiliently pressed against the pan 25 in the manner described, function as an auxiliary hold-down device.

The next curve indicates one complete cycle of operation of the molding means D which have been more specifically described as the rougheners 208. Beginning at the new point of origin, it will be observed that the downward movement of the rougheners, instead of terminating in a period of dwell, is followed by a series of short up and down movements, the last of which continues into a full upward movement to the top of the stroke terminating in a period of dwell beginning at 260° and continuing to 360°. During each downward movement of the rougheners, they are "stationary"—that is to say, they do not rotate. During each of the short upward movements, they revolve under the action of the mechanism which has been described with reference to Figs. 9, 11 and 12. They do not revolve under the final complete upward movement because the gear 234 has passed beyond the end of the rack 236. The rack teeth 235 extend over a distance which substantially corresponds with the distance covered by the series of short up and down movements shown in the diagram. The action of the rougheners is such that in each of the three downward movements, four circular cuts or depressions are made in the surface of the cookies, and as there is only a partial revolution on the upstrokes, the four cuts are made in a different place each time so that they interlace and produce, after baking, a multiplicity of tiny mounds.

The next curve indicates one complete cycle of the advancing motion of the pan 25 which occurs when the cups, discs and rougheners are at or near the limits of their upward movements, occupying the period between 250° and 10°.

The next curve indicates one complete cycle of operation of the hold-down members 174. It will be observed that the downward movement of these members terminates at 60° or at a point in advance of the operating positions of the cups, discs, and rougheners so that the hold-down members engage the pan 25 while the several mold members are descending. The holding period continues to a point beyond that at which the last of the forming members have begun their upward movement, or 210° as shown in the diagram, preventing the buckles from snapping up again and damaging the cookies against the rising formers. Thereafter the holding members move upwardly a sufficient distance to clear the edge of the pan 25, where they dwell for the period from 270° to 360°. The forward motion of the pan 25 does not begin until the hold-down members 174 have been raised sufficiently to clear the edge of the pan and the forward motion of the pan terminates before the hold-down members have moved downwardly far enough to interfere with the edge of the pan.

Figure 5:
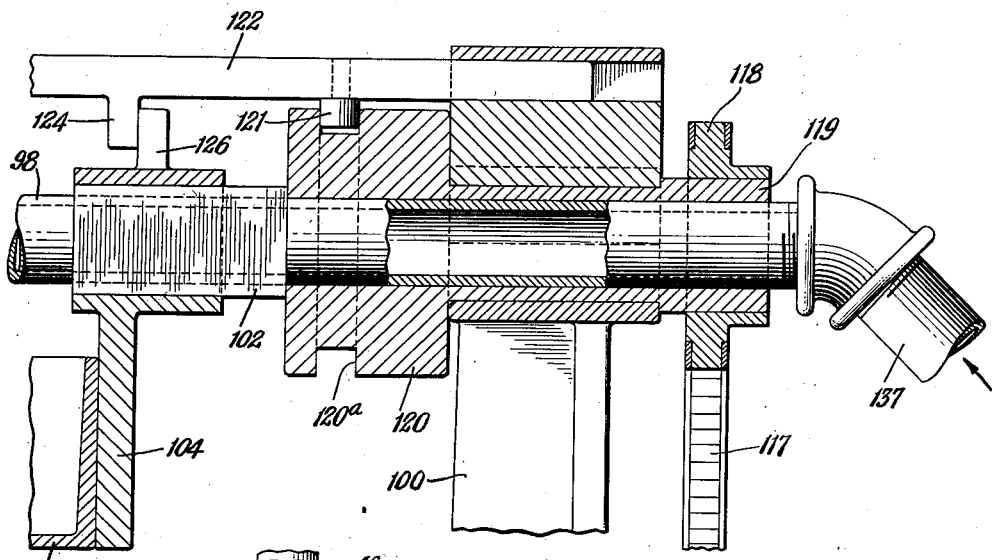

The next two curves are drawn from a single origin. The one which will be described first bears the legend "brush" and indicates a complete cycle of operation of the cleaning and/or wetting means and shield or pan, for the cup and disc-forming units. Since, in the preferred embodiment which has been described, the cleaning and wetting means is directly attached to the pan, these all move as a unit and the curve will be understood as referring either to the movement of this unit or to the movement of such of its component parts as it may be desired to use independently of the others. Referring now to the complete brush unit as specifically described with particular reference to Fig. 4, it will be seen that the brush begins its downward movement at 340° or in advance of the point where the cups and discs begin their downward movement. In this way the brush unit swings to one side of the path of reciprocation of the cups and discs during, but slightly in advance of their downward travel. Conversely, the brush unit swings back into the path of reciprocation of the cups and discs during, but slightly behind the upward travel of the latter. In this way the brush unit operates during reciprocation of the cups and discs, and it becomes possible to begin the application of water to these mold members before they have reached the limit of their upward movement. As shown in this part of the diagram, the water is turned on at 235°. The brushes at this point being a little distance away from the discs and pressed tightly against the retaining rings 109 by springs 110, the fluid is forced through holes 108 (Fig. 4) forming a spray which thoroughly saturates the discs and brushes before they come into contact. Just before the wetting unit completes its upward swing, the movement of the brushes is arrested by the now stationary discs 158, and the springs 110 now press the brushes against the discs, leaving a space between brush base 107 and retaining ring 109 through which the fluid now flows freely and washes away the material removed from the discs in the previous operation. The brushes are now ready to do their cleaning. This could be done by rotation of the brushes, but in my preferred construction the whole wetting unit now slides endwise or across the machine and back again, under the action of cam 120 and slide bar 122 (Fig. 5). This occurs during the dwell period from about 265 to 345 degrees.

Referring to Fig. 2, it will be observed that the trough 141 is shaped to conform with the arc of movement of the brush unit so as to permit the water to drain from the pan 105 during its oscillation or downward movement while effectively shielding the dough and supporting means therefor.

The curve which bears the legend "spray" refers to the sprays 208 and may be considered as including also the shield or water pan 210, both of which parts in my preferred construction are arranged to operate as a unit. The movement of the spray unit is similar to the movement of the brush unit. The spray unit begins to move downwardly at 340° or in advance of the point at which the rougheners begin to move downwardly. Thus the spray unit moves downwardly during downward movement of the rougheners but slightly in advance thereof. Conversely, the spray unit moves upwardly slightly behind the rougheners, although a substantial part of their upward motions occur during the same period. This permits the water to be turned on before the rougheners have reached the upper limit of their travel. The timing for both brush and spray units has been so arranged that they may conveniently be turned on at the same time and off at the same time, and in the diagram the representation of the water control applies to both units.

If it is desired to apply a coating or deposit of sugar or other substance to the confections as by means of the mechanism F, this mechanism should be arranged so as to deposit the substance during the period between intermittent advancement of the pan. On the other hand, the sugar measuring cups below the hopper 260 are refilled during the advance of the pan. In the diagram I have shown a sugar depositing operation between 80° and 180°, and a sugar measuring or refilling operation between 230° and 340°.

It should be understood that the timing diagram is given merely by way of illustration, and that the velocities, accelerations, distances and timing are subject to considerable variation while retaining important advantages of the invention. For example, the roughening elements may be caused to make a greater or lesser number of intermediate short up and down movements. In some cases, it may be desirable to render the roughening means inoperative. Also, in some cases, it may be desirable to omit the peripheral mold elements which can be done by detaching the cups 145 from the brackets 146. Again, in molding some kinds of confections, it may be found possible to substitute a simple wetting unit for the combined scrubbing and wetting units 106. With particular reference to the coordination of the movements of the several forming elements and hold-down members, I consider that it is particularly advantageous that they be brought to the ends of their downward or advancing movements serially in the order: hold-down member, peripheral mold member, face mold member. In order to more effectively separate the forming members from the dough, I have found that it is advantageous to remove the several elements from the ends of their advancing movements serially in the order: peripheral mold member, face mold member, hold-down member.

The terms "forming means" (or element or member) and "mold element" (or member) as used herein and in the appended claims are defined as including all members which can be used in shaping the dough. These terms, therefore, are to be construed as including specifically the cups or peripheral mold members 145, the discs or face mold members 158 and the rougheners 208.

The term "dough" as used herein and in the appended claims is defined as including the particular types of dough which are more commonly referred to as "batters". The invention is of especial value in the molding of cooky batters or dough which are moist and sticky.

While I have shown and described a machine having a number of duplicate units, it will be understood that the same principles are applicable to a machine having a single forming unit and a single hold-down unit alone or in combination with a single roughening unit. The machine is applicable, moreover to the formation of cookies and other confections of various shapes, as will be determined by the shape of the cups 145 and discs 158. The terms and expressions which I have employed are used as terms of description and not of limitation, and I have no intention of excluding such equivalents of the invention set forth, or of portions thereof, as fall within the purview of the claims.

I claim:

1. In a machine of the class described, dough forming means comprising a mold member, a brush, and a pan, means for reciprocating the mold member, means for bringing the brush and pan into the path of reciprocation of the mold member, means for delivering a cleaning fluid to the brush, and means for moving the brush across the face of the mold member.

2. In a machine of the class described, dough supporting means, dough forming means comprising a peripheral mold member and a face mold member, a hold-down member, each of said members being arranged for movement toward and away from the supporting means, and means for controlling their movements to bring them to the ends of their advancing movements serially in the order: hold-down member, peripheral mold member, face mold member, and to remove them from the ends of their advancing movements serially in the order: peripheral mold member, face mold member, hold-down member.

3. In a machine of the class described, dough supporting means, dough forming means comprising a roughening member, an intermittently acting hold-down member for the dough supporting means, each of said members being arranged for movement toward and away from the supporting means, and means for controlling their movements to bring the roughening member to the end of its advancing movement a plurality of times while the hold-down member is held at the end of its advancing movement.

4. In a machine of the class described, dough supporting means, dough forming means comprising a roughening member, an intermittently acting hold-down member for the dough supporting means, each of said members being arranged for movement toward and away from the supporting means, means for controlling their movements to bring the roughening member to the end of its advancing movement a plurality of times while the hold-down member is held at the end of its advancing movement, and means for changing the position of the roughening member between its several advanced positions to alter its successive forming actions on the dough.

5. In a machine of the class described, dough supporting means, dough forming means comprising a roughening member, an intermittently acting hold-down member for the dough supporting means, each of said members being arranged for movement toward and away from the supporting means, means for controlling their movements to bring the roughening member to the end of its advancing movement a plurality of times while the hold-down member is held at the end of its advancing movement, and means for rotating the roughening member to alter its successive forming actions on the dough.

6. In a machine of the class described, dough supporting means, dough forming means comprising a roughening member, means for moving the roughening member toward and away from the supporting means, and means for changing the position of the roughening member between its several advanced positions to alter its successive forming actions on the dough.

7. In a machine of the class described, dough supporting means, dough forming means comprising a roughening member, means for moving the roughening member toward and away from the supporting means, and means for rotating the roughening member to alter its successive forming actions on the dough.

8. In a machine of the class described, dough supporting means, dough forming means comprising a roughening member, means for advancing the roughening member toward the supporting means, means for partially withdrawing said member from its point of farthest advance and returning it to said point in a shifted position to produce a series of forming actions, and means for wetting the face of said member between successive series of forming actions.

9. In a machine of the class described, dough supporting means, dough forming means comprising a roughening member, means for advancing the roughening member toward the supporting means, means for partially withdrawing said member from its point of farthest advance and returning it to said point in a shifted position to produce a series of forming actions, a wetting member and a shield, and means for bringing the wetting member and shield into the path of movement of the roughening member when said member is withdrawn between successive series of forming actions.

10. In a machine of the class described, dough supporting means, dough forming means comprising a peripheral mold member and a face mold member, means for moving said members toward and away from the supporting means, an adjustable stop member for limiting the movement of the face mold member in the direction away from the supporting means, and a resilient member associated with the moving means to absorb excess force applied to the face mold member by the moving means after the movement of the mold member is arrested by the stop member.

11. In a machine of the class described, dough supporting means, dough forming means comprising a peripheral mold member and a face mold member, and means for imparting vertical reciprocation to said members toward and away from the supporting means, said reciprocating means comprising a pair of members movable both in conjunction with and independently of the mold members, one of said pair of members having a positive driving connection and an impositive driving connection with the peripheral mold member.

12. In a machine of the class described, dough supporting means, dough forming means comprising a peripheral mold member and a face mold member, and means for imparting vertical reciprocation to said members toward and away from the supporting means, said reciprocating means comprising a pair of members movable both in conjunction with and independently of the mold members, one of said pair of members having a positive driving connection and an impositive driving connection with the peripheral mold member and an impositive driving connection with the face mold member.

13. In a machine of the class described, dough supporting means, dough forming means comprising a peripheral mold member and a face mold member, and means for imparting vertical reciprocation to said members toward and away from the supporting means, said reciprocating means comprising a pair of members movable both in conjunction with and independently of the mold members, one of said pair of members having a positive driving connection and an impositive driving connection with the peripheral mold member and an impositive driving connection with the face mold member, and the other of said pair of members having a positive driving connection with the face mold member.

14. In a machine of the class described, dough supporting means, dough forming means comprising a peripheral mold member and a face mold member, and means for imparting vertical reciprocation to said members toward and away from the supporting means, said reciprocating means comprising a pair of members movable both in conjunction with and independently of the mold members, one of said pair of members having a positive driving connection and an impositive driving connection with the peripheral mold member and an impositive driving connection with the face mold member, and the other of said pair of members having a positive driving connection with the face mold member in one direction and being arranged to move independently of the face mold member in the other direction.

15. In a machine of the class described, dough supporting means, dough forming means comprising a peripheral mold member and a face mold member, means for imparting vertical reciprocation to said members toward and away from the supporting means, said reciprocating means comprising a pair of members each moving in the same direction as the other during the major portion of their cycles of reciprocation but with variations in the timing of their movements, and resilient means cooperating with one of said pair of members and with said peripheral and face mold members.

16. In a machine of the class described, dough supporting means, dough forming means comprising a peripheral mold member and a face mold member, means for imparting vertical reciprocation to said members toward and away from the supporting means, said reciprocating means comprising a pair of members each moving in the same direction as the other during the major portion of their cycles of reciprocation but with varations in the timing of their movements, and a stop member and resilient means cooperating with the peripheral and face mold members to modify the cycles of reciprocation imparted to the peripheral and face mold members by said pair of members.

17. In a machine of the class described, dough supporting means, a dough forming member, and means for moving the forming member toward and away from the supporting means comprising a member arranged to move away from the supporting means and resiliently urge the forming member in the same direction during such movement, said moving means also comprising a second member arranged to move away from the supporting means and positively restrain the movement of the forming member in the same direction.

18. In a machine of the class described, dough supporting means, a dough forming member, means for moving the forming member toward and away from the supporting means comprising a member arranged to move away from the supporting means and resiliently urge the forming member in the same direction during such movement, said moving means also comprising a second member arranged to move away from the supporting means and positively restrain the movement of the forming member in the same direction during at least a part of its stroke, and a stop member arranged to limit the extent of movement of the forming member in said direction.

19. In a machine of the class described, dough supporting means, a dough forming member, means for moving the forming member toward and away from the supporting means comprising a member arranged to move away from the supporting means and resiliently urge the forming member in the same direction during such movement, said moving means also comprising a second member arranged to move away from the supporting means and positively restrain the movement of the forming member in the same direction during at least a part of its stroke, a stop member arranged to limit the extent of movement of the forming member in said direction, a cleaning member movable into the path of reciprocation of the forming member as it moves in said direction, and resilient means for urging the cleaning member against the forming member at the limit of its movement in said direction.

20. In a machine of the class described, means for supporting dough, a dough forming member arranged for movement toward and away from the supporting means, means for positively controlling the movement of the forming member during part of its travel toward the supporting means, and means for releasing the forming member from the controlling means as it approaches the supporting means.

21. In a machine of the class described, means for supporting dough, a dough forming member arranged for movement toward and away from the supporting means, means for positively controlling the movement of the forming member during part of its travel toward the supporting means, and means for releasing the forming member from the controlling means as it approaches the supporting means and for again subjecting it to the action of the controlling means at the end of its movement toward the supporting means.

22. In a machine of the class described, means for supporting dough, a dough forming member arranged for movement toward and away from the supporting means, means for positively controlling the movement of the forming member during part of its travel toward the supporting means and during its movement away from the supporting means after separation from the dough, means for releasing the forming member from the controlling means as it approaches the supporting means, and means for resiliently urging the forming member away from the supporting means at the completion of the forming action when still in contact with the dough.

23. In a machine of the class described, means for supporting dough, dough forming means comprising a peripheral mold member and a face mold member, said members being arranged for movement toward and away from the supporting means, means for controlling the movement of the mold members to cause the peripheral mold member to begin its movement away from the supporting means in advance of the face mold member, and means for resiliently urging the face mold member away from the supporting means at the completion of the forming action when still in contact with the dough.

OTTO G. BRAUTIGAM.